United States Patent [19]

Lijten et al.

[11] Patent Number: 5,201,689
[45] Date of Patent: Apr. 13, 1993

[54] STIFF CORD

[75] Inventors: Franciscus A. T. Lijten, Heveadorp; Gerrit Ruitenberg, ED Velp, both of Netherlands

[73] Assignee: Akzo N.V., Arnhem, Netherlands

[21] Appl. No.: 787,893

[22] Filed: Nov. 5, 1991

[30] Foreign Application Priority Data

Nov. 5, 1990 [DE] Fed. Rep. of Germany ....... 4035058

[51] Int. Cl.$^5$ .............................................. F16G 1/00
[52] U.S. Cl. .................................................... 474/268
[58] Field of Search ................................ 474/260–268

[56] References Cited

U.S. PATENT DOCUMENTS

| | | | |
|---|---|---|---|
| 4,083,261 | 4/1978 | Speer et al. | 474/268 X |
| 4,861,323 | 8/1989 | Kobayashi et al. | 474/268 X |
| 4,994,000 | 2/1991 | Simon et al. | 474/268 X |

*Primary Examiner*—Thuy M. Bui
*Attorney, Agent, or Firm*—Oliff & Berridge

[57] ABSTRACT

Stiff cords especially useful for reinforcing V-belts are made from yarns formed of extruded filaments. Almost all of the filaments have a core and a complete sheath. The proportion of sheathed filaments, A in percent to all of the sheathed filaments in the yarn, in which the proportion of the sheath in each sheathed filament is ($M \pm 0.1$) percent of the total volume of the sheathed filament, simultaneously satisfies the conditions $A \leq 100$; $M \geq 0.5$; $A \geq 30 + (0.1\ M)^8$. The sheath is formed of a polymer having a melting point at least 10° C. below the melting point of the polymer forming the core. One such sheathed filament has a core formed of polyethylene terephalate and a sheath formed of a copolymer of polyethylene terephalate and sulfoisophthalic acid.

12 Claims, No Drawings ic # STIFF CORD

BACKGROUND OF THE INVENTION

1. Field of the Invention

The invention relates to the use of special yarns for manufacturing stiff cords, stiff cords made of special yarns, and V-belts containing stiff cords made of special yarn.

2. Description of Related Art

In manufacturing V-belts, especially V-belts with open flanks, so-called stiff cords are used which serve to reinforce the V-belts. As a rule, V-belts with open flanks have trapezoidal cross sections. They can also have a cross section composed of a plurality of trapezoids superimposed on one another. Cross sections of this kind are described for example in the informational publication from Akzo nv entitled "Akzo Industrial Yarns for Transmission Belts IER/148," 8, 1991. To make the V-belts, the stiff cords are embedded in an elastomer in such fashion that a wide elastomer strip results which contains the stiff cords as reinforcing inserts to reinforce it. The V-belts are cut from this strip, with the final cross sectional shape of the V-belts being obtained by cutting. To be able to ensure clean cuts, in the type of manufacture of V-belts known at the present time, assurance must be provided that the stiff cords, composed of a plurality of filaments, do not fray or separate. Resistance to fraying or separating of the stiff cords has been achieved by methods known previously by subjecting the cords to a dip treatment before embedding them in the elastomer, with a resin, based as a rule on a diisocyanate prepolymer, dissolved in toluene, methylene chloride, or methyl chloroform, being used as the dip bath liquid. This dip bath was followed by drying the dipped cords. The evaporation of the above-mentioned solvents required for drying poses a serious problem. Firstly, toxic and highly explosive vapors are produced when these solvents are evaporated; secondly, these solvents are very expensive, so that the solvent vapors must be drawn off as completely as possible in a costly process, and must be recovered as completely as possible in liquid form. The dipped and dried cords are called stiff cords.

SUMMARY OF THE INVENTION

An object of the present invention is to provide stiff cords, especially stiff-cords for V-belts, in the manufacture of which little or no toxic and/or explosive solvent vapors are produced and the manufacture of which is especially economical.

This and other objects of the invention are achieved by the use of a yarn composed of filaments having a core and a sheath to produce stiff cords. The core and sheath of the filaments are produced by extruding spinnable polymers. Nearly all of the sheathed filaments have a complete sheath. The fraction of sheathed filaments, A in percent, of all sheathed filaments in the yarn, in which the fraction of the sheath in each sheathed filament is equal to $(M \pm 0.1 \, M)$ percent of the total volume of the corresponding sheathed filament, simultaneously satisfies the following conditions: $A \leq 100$; $M \geq 0.5$; $A \geq 30 + (0.1 \, M)^8$.

Such yarns are described in U.S. Pat. Application Ser. No. 07/635,185 filed Jan. 3, 1991, the disclosure of which is incorporated herein by reference. Surprisingly, it has been found that these yarns are especially well suited for use in making stiff cords. When these yarns are used to make stiff cords, the known dip method described above is unnecessary. The yarns can be fed directly into an elastomer dip bath, with the temperature prevailing in this bath and/or in the downstream curing zone, depending on the material used for the sheath of the sheathed filaments, being sufficient to ensure the interfilamentary adhesion required for stiff cords. For other sheath materials, it may be required to pretreat these yarns by a special heat treatment before the elastomer dip treatment, with the temperature being selected so that the sheath material melts and the core filaments are bonded to one another to an extent which is sufficient for stiff cords.

When these yarns are used to manufacture stiff cords it is especially favorable for the sheathed filament proportion A to be $\geq 40 + 7 \, (0.1 \, M)^8$.

In particular, yarns in which at least 60% of the sheathed filaments have a sheath component of $M \pm 0.1 \, M$ vol. %, with $M \leq 9$ vol. %, especially yarns in which at least 70% of the sheathed filaments have a sheath component of $M \pm 0.1 \, M$, where $1 \, \text{vol. \%} \leq M \leq 7 \, \text{vol. \%}$, and especially yarns in which at least 75% of the core and sheathed filaments have a sheath component of $M \pm 0.1 \, M$, where $3 \, \text{vol. \%} \leq M \leq 6 \, \text{vol. \%}$, have proven themselves to be especially suitable for use in making stiff cords.

In this respect, a polyester, especially polyethylene terephthalate, is suitable as the core material, while the sheath preferably is comprised or consists of a copolyester which is a polyethylene terephthalate in which a portion of the terephthalic acid has been replaced by sulfoisophthalic acid. In this regard the replacement of 0.5 to 2 wt. % of the terephthalic acid by sulfoisophthalic acid has been shown to be especially advantageous. In the resulting sheathed filaments, the melting point of the sheath is at least 10° C. lower than the melting point of the core.

Objects of the invention are likewise achieved by a stiff cord made from the yarns described above.

Objects of the invention are likewise achieved by a V-belt containing stiff cords made from the yarn described above.

DESCRIPTION OF PREFERRED EMBODIMENTS

The invention will now be described in greater detail with reference to the following examples:

Stiff cords were produced, with a commercially available yarn I called Diolen 779 and two yarns made of sheathed filaments consisting of polyethylene terephthalate core and a modified polyethylene terephthalate in the sheath, with the sheath polymer being modified in such manner that the melting point of the sheath polymer was lower than that of the core polymer. The sheath polymer was modified by the addition of 1% by weight of sulfoisophthalic acid, resulting in a polyethylene-iso-terephalate copolymer. The melting point of the sheath was about 250° C. and the melting point of the core was about 265° C. The volume percentage of the sheath in the total volume of the sheathed filaments was 10%, with all the sheathed filaments having a continuous sheath and the volume percentage of the sheath in all the individual filaments being between 9 and 11%.

All the yarns having a linear density of 1132 Dtex were processed for a cord construction 1100×3 Z 100×3 S 100. The yarn of Cord I had a strength of 691 mN/ tex and a breaking elongation of 10.9%, while each yarn of cords II and III had a strength of 685 mN/tex and a breaking elongation of 9.6%.

Cord I was initially preimpregnated with M 220, with the cord initially being pretreated for 120 sec at 120° C. and at a load of 80 N and then cured for 60 sec at 240° C. and a load of 80 N. M 220 is the designation for the dip bath in which 10% diisocyanate prepolymer (Voronate M 220 from Dow Chemicals) was dissolved in toluene. In the case of cords II and III, this pretreatment, during which vapors harmful to health are released, was not performed.

Then all three cords were dipped in a known dip composition for improving adhesion to rubber and were further processed for improving the modulous and heat shrinkage properties of the yarn. One such dip, identified as an RFL-dip is obtained as follows:

| Water | 8164 p.b.w. |
|---|---|
| Sodium hydroxide solution 5% | 212 p.b.w. |
| Resorcinol | 386 p.b.w. |
| Formaldehyde solution 37% | 552 p.b.w. |
| Total resin | 9314 p.b.w. |
| The resin is condensed for 6 hours at 24° C. and then added to: | |
| Water | 1926 p.b.w. |
| Vinylpyridine latex 40% | 8760 p.b.w. |
| Total latex | 10686 p.b.w. |
| Total dip 20% t.s.c. | 20000 p.b.w. |

The manufacture of the RFL dip is described in the Akzo publication "Akzo Industrial Yarns for Transmission Belts, IER/148," 8, 1991, page 23 (the disclosure of which is incorporated herein by reference), in which a pretreatment phase and a curing phase were likewise performed before dipping. The following conditions were observed:

| Cord I | |
|---|---|
| Pretreatment: | 120 sec, 150° C., 80 N |
| Curing: | 60 sec, 200° C., 80 N |
| Cord II: | |
| Pretreatment: | 120 sec, 150° C., 80 N |
| Curing: | 45 sec, 240° C., 80 N |
| Cord III: | |
| Pretreatment: | 120 sec, 150° C., 80 N |
| Curing: | 45 sec, 245° C., 80 N |

The stiffness of Cord I was 30.8 SU, that of Cord II was 31.1 SU, and that of Cord III was 67.7 SU. The stiffness was measured in all three cords under the same conditions, using a Taber Model 150-B V-5 stiffness tester and expressed in SU (stiffness units).

The curing steps for Cords II and III were carried out at temperatures which cause the sheath polymer to soften. Therefore the filaments adhered together after solidification.

This clearly shows that, as a result of the use according to the invention of a proportion of sheathed filaments wherein the volume of the sheath lies within the defined percentage range, and without using the otherwise conventional predips for cords, during the curing of which toxic and explosive vapors are produced, the same (Cord II) or even a much higher (Cord III) stiffness can be reached than in previously conventional stiff cords, for which, however, predipping could not be eliminated.

What is claimed is:

1. A V-belt comprising:
   a body;
   a stiff cord within the body, the stiff cord comprising yarns formed of a plurality of sheathed filaments, the filaments being formed of spinnable polymers, almost all of the sheathed filaments having a complete sheath and wherein the percentage of sheathed filaments, A, as a percentage of the sheathed filaments in the yarn, with the sheath of each sheathed filament being $(M \pm 0.1 M)$ percent by volume of the respective sheathed filaments, simultaneously satisfy the following conditions:

$A \leq 100$
   $M \geq 0.5$
   $A \geq 30 + (0.1 M)^8$.

2. A V-belt as in claim 1, wherein $A \geq 40 + 7 (0.1 M)^8$.

3. A V-belt as in claim 1, wherein $A \geq 50 + 100 (0.1 M)^8$.

4. A V-belt as in claim 1, wherein at least 60% of the sheathed filaments have a sheath component $(M \pm 0.1 M)$, wherein $M \leq 9$ vol. %.

5. A V-belt as in claim 1, wherein at least 70% of the core sheathed filaments have a sheath component $(M \pm 0.1 M)$, wherein $1$ vol. % $\leq M \leq 7$ vol. %.

6. A V-belt as in claim 1 wherein at least 75% of the core sheathed filaments have a sheath component $(M \pm 0.1 M)$, wherein $3$ vol. % $\leq M \leq 6$ vol. %.

7. A V-belt as in claim 1, wherein the core of the sheathed filaments comprises polyethylene terephthalate.

8. A V-belt as in claim 1, wherein the sheath of the sheathed fibers comprises a copolyester of polyethylene terephthalate and sulfoisophthalic acid.

9. A V-belt as in claim 8, wherein the sulfoisophthalic acid comprises 0.5 to 2 wt. % of the copolyester.

10. A V-belt as in claim 1, wherein the sheathed filaments each have a core and a sheath, the sheaths of the filaments forming a heat softenable binder, which binder after solidification adheres the filaments together to form stiff cords.

11. A V-belt as in claim 10 wherein the melting point of the sheath of the filaments is below the melting point of the cores.

12. A V-belt as in claim 11, wherein the melting point of the sheaths is at least about 10° C. below the melting point of the cores.

* * * * *